United States Patent
Stroh

[11] 3,893,476
[45] July 8, 1975

[54] RELIEF VALVE CORE
[75] Inventor: William Sylvester Stroh, Dickson, Tenn.
[73] Assignee: Scovill Manufacturing Company, Waterbury, Conn.
[22] Filed: Mar. 8, 1974
[21] Appl. No.: 449,333

[52] U.S. Cl. ........................................ 137/543.17
[51] Int. Cl. ............................................. F16k 15/02
[58] Field of Search . 137/540, 542, 543.13, 543.15, 137/543.17, 543.19, 543.21, 543.23; 251/337

[56] References Cited
UNITED STATES PATENTS

| | | | |
|---|---|---|---|
| 1,756,652 | 4/1930 | Maynard | 137/543.15 X |
| 1,861,420 | 5/1932 | Mahan | 137/543.15 X |
| 2,124,844 | 7/1938 | Boroughs | 137/543.15 X |
| 2,197,271 | 4/1940 | Kerrick | 137/540 |
| 3,425,444 | 2/1969 | Jones | 137/540 |
| 3,430,647 | 3/1969 | Suchowolec | 137/543.17 X |
| 3,463,185 | 8/1969 | Oliver et al. | 137/543.21 X |
| 3,605,793 | 9/1971 | Kinsel | 137/543.13 X |

*Primary Examiner*—William R. Cline
*Attorney, Agent, or Firm*—Dallett Hoopes

[57] ABSTRACT

Relief valve core adapted to be readily received in a valve housing and comprising a threaded body having an axial bore receiving a pin with a downwardly directed point and a compression spring having an upper end engaging the point. The lower end of the compression spring encircles a stub shaft centrally disposed on a sealing-washer-holding cup.

3 Claims, 4 Drawing Figures

3,893,476
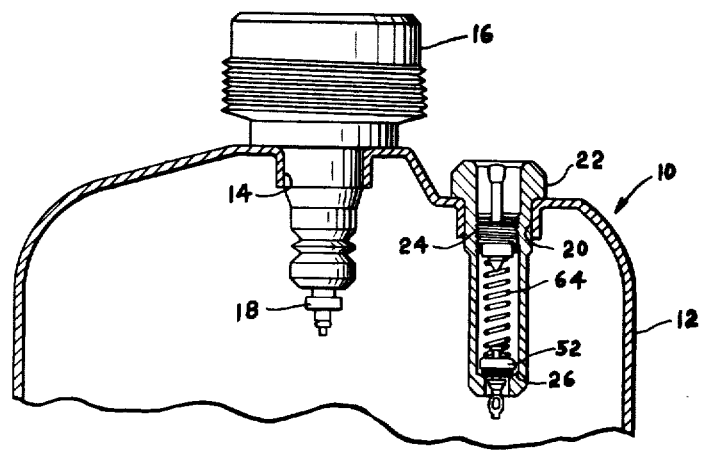
Fig.1.
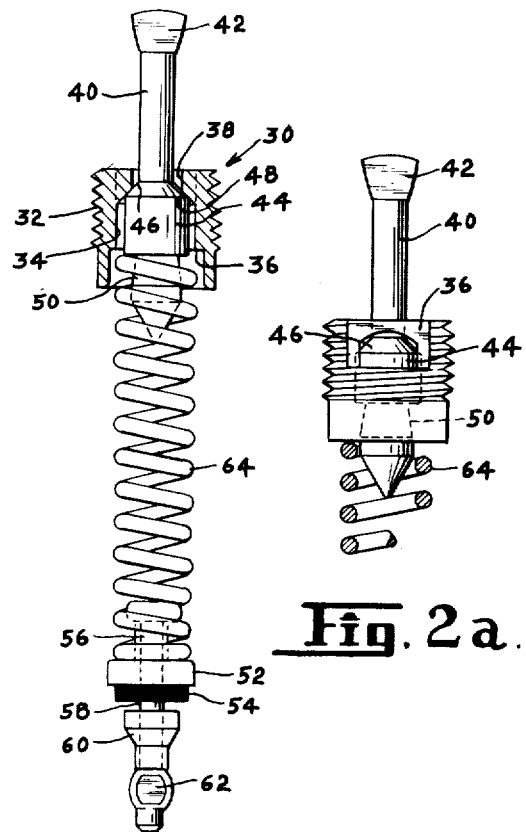
Fig.2a.
Fig.2.
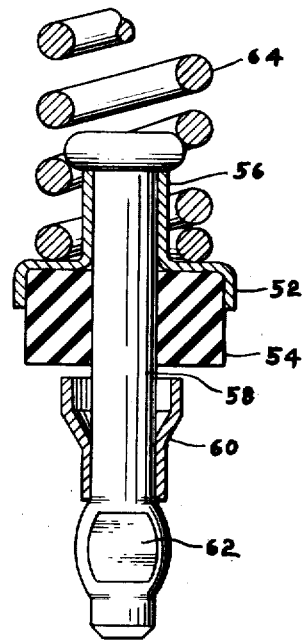
Fig.3.

RELIEF VALVE CORE

BACKGROUND OF THE INVENTION

1. Field of the Invention:

This invention relates to pressure relief valves and more particularly such valves in the form of a core adapted to be inexpensively manufactured and to be screwed into a housing mounted, for instance, in the wall of a pressure vessel. Subsequently, the valve is adapted to unseal in the event of excess pressure buildup in the vessel. Such relief, of course, prevents explosion of the vessel.

2. Description of the Prior Art:

In the prior art, there have been pressure relief valves in which a resilient sealing washer has been pressed against a valve seat by a spring which is held in compression by a threaded body threadedly engaging threads in the structure in the housing above the seat. The threaded body has been set at a depth at which the desired pressure is urged against the sealing washer by the spring.

Various attempts have been made in the past to incorporate such a pressure relief valve into a housing in a manner similar to the way in which a core fits into the housing or body of an automobile tire valve. It has been generally conceded that such a valve core, if it could be made accurate, would be desirable in that such cores are generally inexpensive to manufacture and can be readily removed for cleaning, repair, and replacement.

Several drawbacks have been clearly manifest in such relief core valves as attempted in the prior art. The biggest drawback has been that with the structures in the art, the seating of the valve by screwing the threaded body downwardly in the housing has caused rotation of the compression spring which in turn has also resulted in the rotation of the sealing washer against the valve seat. This relative rotation has distorted the sealing washer and has caused its spreading out of place with respect to the seat so that there has been the danger of the washer being outwardly extruded by the fluid pressure. In addition, the distortion has resulted in great variations and discrepancies in the unsealing pressure of the valve so that the valve has permitted relief of the housing at pressures other than those desired. In other words, the unsealing has not been uniformly repeatable from one valve to the next or, for that matter, in successive unsealings of the same valve.

SUMMARY OF THE INVENTION

Under the present invention, the valve setting pin and head, spring element and washer are connected and may be held at selected position without rotating while the threaded body of the valve may be screwed downward to hold the head in its position. As a result, unsealing pressures of the valve under the present invention can be much more accurately prearranged for and the repeatability of the unsealing is more uniform.

BRIEF DESCRIPTION OF THE DRAWINGS

Other features and objects of the invention will be apparent from a review of the following specification including the drawings, all of which disclose non-limiting embodiments of the invention. In the drawings:

FIG. 1 is a fragmentary sectional view showing a pressure vessel having a valve housing containing a relief valve core embodying the invention;

FIG. 2 is an enlarged elevational view, partly in section, of a modified form of relief valve core;

FIG. 2a is a profile elevational view of the upper portion of FIG. 2 that is in section; and FIG. 3 is a greatly enlarged fragmentary sectional view of the lower end of the core of FIG. 2.

DESCRIPTION OF THE PREFERRED EMBODIMENT

Referring more specifically to the drawings, FIG. 1 is a fragmentary view showing the upper portion of a pressure vessel generally designated 10 of the type that is used to contain liquid petroleum gas, for instance. The vessel comprises a metal container 12 having a central opening 14 in which is brazed or otherwise secured, a fitting 16 containing the conventional fill valve core 18 (only partly shown) similar to that used in a tire valve. Such a fitting may be connected to a torch head, stove, lantern, as is well known in the art. A second opening 20 is provided in the vessel 12 and offset from the axis thereof. In it is brazed or otherwise secured, a valve core housing 22.

As shown in FIG. 1, the housing has a central bore which is interiorly threaded as at 24 and an upwardly-facing valve seat as at 26 therebelow. The purpose of the housing 22 is to mount the relief valve core so that as pressure within the vessel 12 builds up, automatic escape of such pressure above a certain magnitude will be accomplished by the relief valve, thereby preventing the explosion of the vessel.

A relief valve core embodying the invention is shown in FIG. 2 and generally designated 30. As shown, the core comprises a cylindrical threaded body 32 similar to that of a tire valve core and having an axial recess 34 extending up from the lower end thereof. The recess, as shown, is stepped inwardly to provide an annular shoulder 36 and permits passage of fluid as does the corresonding part in a tire valve core. Disposed transversely across the upper end of the body 32 is a bridge 36 having a bore 38 disposed axially of the body.

A pin 40 extends upwardly through the bore 38 and is flattened as at 42. Below the bore 38, the pin is formed with an enlarged head 44. The head is formed with an outwardly sloping annular antifriction shoulder 46 which engages a similarly sloping bevel 48 on the underside of bore 38. The lower portion of the head 44 presents a neck 50 reducing slightly in diameter as the upper end of the body is approached. The head terminates in a downwardly directed point.

The sealing means comprises (FIG. 3) the cup 52 and the sealing washer 54. As shown, the cup 52 is formed with central opening having an upwardly extending annular bushing 56. A stub shaft 58 is provided to hold the parts together. It is headed at its upper end and is tightly engaged by the bushing 56 to fix the parts together. The washer 54 snugly and sealingly engages about the shaft 58. A funnel-shaped valve guide and sealing washer retainer 60 is provided on the shaft 58 below the washer 54 and the shaft 58 is staked at 62.

An axial compression spring 64 is provided and its upper end wraps around and is thereby secured to the neck 50 at the lower end of the head. The lower portion of the stepped recess 34 accommodates the increased diameter of the assembly at the lower end of the head 44. The lower end of the spring 64 wraps around and is thereby secured to the upper end of the shaft 58 and annular bushing 56.

In the assembly and seating of the valve core, the lower end thereof is inserted from the outside into the upper end of housing 22 in the vessel 12. It is made to extend downwardly until the threads on the body 32 engage the threads 24. At this point, the upper end 42 of the pin 40 is engaged by a depressing tool (not shown) of controlled force assembly equipment. This tool is biased downwardly at a known pressure urging the washer 54 into engagement with the seat 26 and compressing the spring 64 to the degree necessary to effect the proper unsealing pressure of washer 54. Typically, the unsealing pressure may be in the rante of 360–480 p.s.i. With the pin thus depressed, the depressor and pin 40 are then surrounded by an annular wrench which engages the bridge 36, and the wrench is turned downward until the body 32 is screwed down to the point at which the surfaces 48 and 50 contact. This will be easily sensed by the operator.

The repeatability of the unsealing pressure seating of relief valve cores in accordance with the invention is extremely good due very largely to the fact that during the setting of the valve embodying the invention there has been no rotation of the sealing washer relative to the seat 26. This means that the washer 54 is not distorted against its seat during the installation operation and hence the pressure on the washer 54 at which unsealing occurs is known to a very accurate degree.

It should be understood by those skilled in the art that while the invention has been described in only two embodiments, it is capable of many reasonable variations, all falling within the scope of the following claim language:

I claim:

1. A pressure vessel having a tubular valve housing mounted in an opening therein, the housing having an interiorly threaded upper portion and an upwardly-facing valve seat therebelow; and a relief valve core in the housing comprising;
   a. an exteriorly threaded cylindrical body engaging the interior threads of the housing, the body having an axial recess extending up from the lower end thereof and a bridge extending transversely across the upper end thereof, the bridge having a bore on the axis of the body with a bevelled lead-in from the underside of the bore;
   b. a downwardly-facing plunger cup disposed at the lower end of the core and having a radial wall and a connected downward sidewall;
   c. a sealing washer disposed in the cup and adapted to seat on the upwardly-facing valve seat to close the valve;
   d. a stub shaft having a short section above the cup and extending axially through the center of the radial wall of the cup and being snugly embraced by the sealing washer;
   e. pin means extending freely upward through the bore in the bridge and having an outwardly sloping shoulder and an enlarged head below the bridge, the shoulder engaging the bevelled lead-in of the bridge; and
   f. a spiral compression spring secured to the head at its upper end and wrapped around the short section of the shaft at its lower end;
   whereby when the body is screwed into the housing, the body may be rotated without rotation of the sealing washer.

2. An assembly as claimed in claim 1 wherein the head has a portion which is tapered diminishing in diameter as its upper end is approached and the upper end of the spring is wrapped about the tapered portion to secure it to the head.

3. A relief valve core adapted to be threadedly received into a valve housing having an interiorly threaded upper portion and an upwardly-facing valve seat therebelow, the core comprising:
   a. an exteriorly threaded cylindrical body having an axial recess extending up from the lower end thereof and a bridge extending transversely across the upper end thereof, the bridge having a bore on the axis of the body, with a bevelled lead-in from the underside of the bore;
   b. a downwardly-facing plunger cup disposed at the lower end of the core;
   c. a sealing washer disposed in the cup and adapted to seat on the upwardly-facing valve seat to close the valve;
   d. a stub shaft having a short section above the cup and extending axially through the center of the radial wall of the cup and being snugly embraced by the sealing washer;
   e. pin means extending freely upward through the bore in the bridge and having an outwardly sloping shoulder and an enlarged head below the bridge, the shoulder having a smooth surface and engaging the bevelled lead-in of the bridge; and
   f. a special compression spring secured to the head at its upper end and wrapped around the short section of the shaft at its lower end.

* * * * *